Sept. 2, 1958     T. E. ZURAWIC ET AL     2,850,408
SOLUTION OF β-AMINO LOWER ALKYL CARBAMATE EPICHLOROHYDRIN
REACTION PRODUCT, TEXTILE CREASE-PROOFED
THEREWITH AND METHOD OF MAKING
Filed Feb. 10, 1958

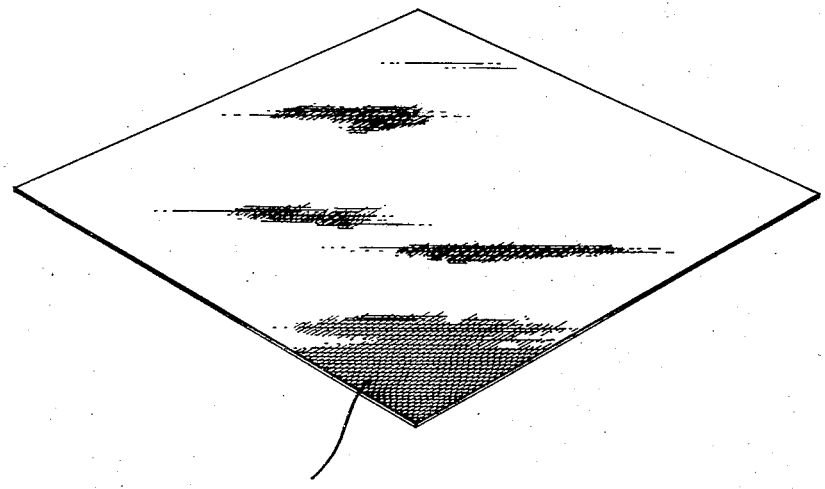

Textile fabric provided with crease resistant finish comprised of thermoset resinous formaldehyde adduct of epichlorohydrin modified β-amino lower-alkyl carbamate reaction product.

INVENTORS.
Theodore E. Zurawic
Richard W. Mundinger
William F. Tousignant
BY    Griswold & Burdick
ATTORNEYS

United States Patent Office 2,850,408
Patented Sept. 2, 1958

2,850,408

SOLUTION OF β-AMINO LOWER ALKYL CARBAMATE EPICHLOROHYDRIN REACTION PRODUCT, TEXTILE CREASE-PROOFED THEREWITH AND METHOD OF MAKING

Theodore E. Zurawic, Richard W. Mundinger, and William F. Tousignant, Midland, Mich., assignors to The Dow Chemical Company, Midland, Mich., a corporation of Delaware Application February 10, 1958, Serial No. 714,428

18 Claims. (Cl. 117—139.4)

This invention relates to, and has as among its principal objectives, the provision of novel thermosettable and thermosetting resinous compositions and formulations adapted to provide such compositions that have particular utility and are especially suited for being employed and applied as finishes for improving the crease and wrinkle resistance and the dimensional stability of textile materials. It also has reference to, and it is among the objects of the invention to provide, a method for utilizing such resinous compositions and the formulations that yield them for improving the crease resistance and dimensional stability of cloth and fabric constructed from various textile fiber materials and to furnish crease resistant and dimensionally stable textile materials by practice of the method and utilization of the resinous compositions of the invention. The present application is a continuation-in-part of the now abandoned application for United States Letters Patent having Serial No. 587,597 which was filed on May 28, 1956.

Resinous compositions, in accordance with the present invention, are comprised of a thermosettable formaldehyde adduct of an epichlorohydrin modified reaction product of urea and an alkylene oxide, said reaction product, prior to being treated and modified with epichlorohydrin, consisting preponderantly of β-amino lower-alkyl carbamates having the general formula:

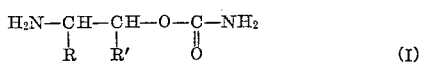

$$H_2N-\underset{R}{C}H-\underset{R'}{C}H-O-\underset{O}{\overset{\|}{C}}-NH_2 \qquad (I)$$

wherein R and R' are members of the class consisting of hydrogen and lower alkyl groups of from 1 to 4 carbon atoms with the sum of the carbon atoms present in R and R' combined being not greater than 4.

Advantageously, the thermosetting resinous formaldehyde adduct compositions of the invention are provided from self-curing aqueous formulations that are adapted to be applied as a finish and thermoset as resinous products on textile materials to provide them with crease and wrinkle resistance and dimensional stability. Such a formulation may be comprised of an aqueous solution containing the β-amino lower-alkyl carbamate and the formaldehyde, which may be partially adducted in the formulation. Although the formulations are self-curing upon exposure to heat at a thermosetting temperature, it may frequently be desirable to provide a suitable curing catalyst or accelerator in the formulation for assisting the formation of the thermoset formaldehyde adduct. Usually, the aqueous formulations for providing the resinous compositions of the invention may be prepared as water white aqueous solutions having a near alkaline pH between about 6.0 and 7.0, a frequently desirable range for textile treating purposes. The formulations may contain as much as 70 percent by weight of active solids, based on the weight of the formulations. Such formulations, when heated and evaporated to dryness, in either the presence or absence of a suitable curing catalyst or accelerator, produce a hard, brittle, clear, water-insoluble thermoset resinous product. The formulations, as indicated, are adapted to be prepared as concentrated, dilutable stocks that may have the catalyst material and other desired ingredients incorporated therein prior to their employment for finishing textile materials.

The crease resistance and dimensional stability of cloth, fabric and other textile fiber (including the so-called "non-woven" fabric) materials may be significantly improved by a method which comprises subjecting the textile material to an aqueous applicating formulation that is adapted to provide the thermoset resinous material in accordance with the invention, impregnating the textile material with between about 5 and 30 percent by weight and, for many purposes, with between about 5 and 15 percent by weight of active solids from said formulation, and subjecting said impregnated textile material in the presence of a curing catalyst to a resin curing temperature between about 250 and 400° F. for a period of time between about one and ten minutes. Lower curing temperatures generally require longer curing times. Advantageously, the aqueous applicating formulation may contain between about 5 and 40 percent by weight of active solids although in many instances it may be convenient for the formulation to be employed with an active solids content of between about 15 to 25 percent by weight. It is usually beneficial to have a minor proportion, usually between about 0.02 and 1.0 percent by weight, of a wetting agent incorporated therein to assist in the wet pickup of the resinous composition from the applicating formulation by the textile material. Ordinarily, it is desirable to dry the impregnated textile material at any water evaporating temperature beneath the curing temperature as, for example, in the neighborhood of 212° F. so that it may be substantially free from water before it is subjected to a curing temperature. It frequently may be desirable to employ a temperature of about 300° F. for about four to five minutes in order to cure the applied resinous material.

The textile material may be impregnated with the formulation in any desired manner. While it is usually convenient to immerse the textile material in an applicating bath of the formulation and subsequently squeeze it free of excess liquid, suitable impregnating results may also be achieved by spraying, brushing or otherwise coating or applying the formulation on the textile material.

Textile materials, particularly cloth and fabric, having an incorporated thermoset application of the resinous composition of the invention, have significantly enhanced crease and wrinkle resistance and improved dimensional stability. In addition, they have acceptably low chlorine rentention and maintain their tensile strength in a suitable manner, even after exposure to chlorine. They are possessed of a good hand and retain their other desirable physical characteristics so that they may advantageously be employed for various clothing and other cloth and fabric uses. Finished materials in accordance with the invention are generally at least equivalent and may frequently be superior to materials that are provided with conventional melamine, ethylene urea and the like resin finishes employed for obtaining crease resistant properties. The textile materials that may be benefitted by practice of the invention may be of any desired origin, natural, artificial and synthetic including cotton, wool, silk, viscose and acetate rayon and acrylic, polyamide (including nylon "66" which is a condensation polymer of hexamethylene diamine and adipic acid and nylon "6" which is a condensation polymer of epsilon-caprolactam), polyester (including "Dacron" which is a condensation polymer of ethylene glycol and terephthalic acid and the like glycol terephthalates) and like synthetic materials. Frequently, however, the greatest benefit may be secured when the invention is practiced with textile materials that consist of, comprise or contain natural or artificial cellulosic fibers, or both. A piece of crease resistant fabric finished with a thermoset resinous composition in accordance with the present invention is schematically illustrated in the accompanying drawing.

The reaction product of urea and a lower alkylene oxide that is utilized for obtaining the thermosetting resinous compositions of the present invention may advantageously be the reaction product of between about 0.6 and 1.2 moles, and more advantageously in the neighborhood of 0.8 mole, of the alkylene oxide per mole of urea. Such β-amino lower-alkyl carbamates and the method for their preparation are in general accordance with those which have been disclosed by William F. Tousignant and Thomas Houtman, Jr. in their copending application having Serial No. 449,477 which was filed on August 12, 1954. Such products may be prepared by gradually adding to and thoroughly mixing with liquified urea that is maintained in a reaction vessel at a reaction temperature beneath about 140° C. and under a pressure of from about 40 to 100 pounds per square inch (gauge), a substantially anhydrous alkylene oxide of the class consisting of ethylene oxide; 1,2-propylene oxide; 1,2-butylene oxide; and 2,3-butylene oxide at a rate in the range of from about 0.1 to 0.5 pound per hour per pound of urea charged until from about 0.85 to 1.2 molecular proportions of alkylene oxide have been reacted per molecular proportion of urea.

While the essentially 1-methyl-2-amino ethyl carbamate product of the reaction between propylene oxide and urea may be converted to resinous formaldehyde adduct compositions with particular advantage in the practice of the invention, other β-amino lower-alkyl carbamates may also be beneficially employed. Thus, for example, the essentially 2-amino ethyl carbamate product of reaction between ethylene oxide and urea may also be utilized. Likewise, the reaction product of butylene oxide with urea, consisting essentially of 1-ethyl-2-amino ethyl carbamate may be used. In addition, reaction products of mixed lower alkylene oxides and urea may be suitable for further reaction with epichlorohydrin (which is also known as chloropropylene oxide) for subsequent formation of the formaldehyde adducts, as may be mixtures of various β-amino lower-alkyl carbamates.

The amount of epichlorohydrin that is employed for treating and modifying the β-amino lower-alkyl carbamates (in the same manner as employed for formation of the latter) may beneficially be between about 0.05 and 0.40 mole for each mole of modified urea in the β-amino lower-alkyl carbamate. Advantageously, in the neighborhood of 0.1 mole of epichlorohydrin is reacted with a quantity of the β-amino lower-alkyl carbamate that contains about a mole of modified urea prior to formation of the formaldehyde adduct. In actual practice, the epichlorohydrin may be reacted in the same reaction vessel and under the same conditions as involved in the carbamate-forming reaction between the urea and the alkylene oxide. As a matter of fact, commensurate good results may be obtained in such manner regardless of whether the epichlorohydrin is added before, simultaneously with, or after the addition of the alkylene oxide to the urea. Of course, the epichlorohydrin can also be added to an already formed β-amino lower alkyl carbonate under similar conditions if such manner of operation is desired. In certain instances it may be desirable and suitable to employ a mixture of the reaction product of epichlorohydrin and urea with a β-amino lower-alkyl carbamate instead of reacting the latter with epichlorohydrin, provided that the constitution of the thereby obtained mixture is in accordance with the invention with respect to modified urea, reacted alkylene oxide and reacted epichlorohydrin content.

The resinous epichlorohydrin-modified, β-amino lower alkyl carbamate products of the present invention are generally, upon their initial formation, thick, viscous, water-soluble liquids which usually have a more or less greenish-yellow appearance. Their precise characteristics, of course, depend to some extent upon their particular composition, as will be appreciated by those who are skilled in the art. Upon standing, they may convert to relatively wet, granular and sugary appearing, semi-crystalline semi-solids which retain their water-soluble characteristics and essential color. In either event, such epichlorohydrin modified products are advantageously adapted for use in thermosetting compositions when suitably formulated to such end according to the present specification and description.

The formaldehyde that is incorporated in the resinous composition providing aqueous formulation may usually be added conveniently in the form of an aqueous solution, such as one that contains in the neighborhood of 37 percent by weight of dissolved formaldehyde. Stronger formaldehyde solutions may also be employed, if desired, as may be compounds that yield formaldehyde such as paraformaldehyde, trioxane and the like. As mentioned, some of the formaldehyde in the formulation may adduct with the dissolved β-amino lower-alkyl carbamate dissolved therein before the formulation is cured to a resinous composition. Despite this, the active solids of the formulation remain soluble until they are purposely cured by exposure to a suitable curing temperature.

Various acid curing catalysts and accelerator materials may be employed beneficially in the resinous composition-providing formulation of the invention. For example, an acid catalyst may be used which is selected from the group consisting of tartaric acid, adipic acid, citric acid and phosphoric acid. Advantageously, however, such accelerator materials may be employed as the alkanolamine hydrochloride type of curing catalyst and the like including 2-amino isopropanol hydrochloride (which is available from the Monsanto Chemical Company under the designation "Catalyst AC"), as well as other varieties of such type curing catalysts, including those which are described in United States Letters Patent No. 2,467,160. A magnesium chloride accelerator composition (such as the form thereof which is available from American Cyanamid Company under the designation "Aerotex Accelerator MX") may also be employed suitably as may equivalent curing catalyst and accelerator materials. Usually an amount of the catalyst or accelerator that is up to about 10 percent by weight, and preferably about 5 percent by weight, based on the weight of active solids in the formulation, may be satisfactory.

By way of further illustration, a crease resistant finish formulation containing a resinous composition in accordance with the present invention was prepared by mixing about 24.3 pounds of the reaction product of propylene oxide and urea in a 0.79 to 1 respective mole ratio which was treated with about 0.12 moles of epichlorohydrin to complete the reaction product. The reaction product was actually made by charging the urea to a 10 gallon pressure vessel; flushing the charge twice with nitrogen; heating the urea to 130–132° C.; venting the vessel until a substantially complete vacuum was attained; then pumping the propylene oxide into the vessel under about 80 pounds per square inch (gauge) pressure while maintaining the pressure and temperature until completion of the addition, all of which required about 3 hours. After this, under the same conditions of pressure and temperature, the epichlorohydrin was added to the reaction mass. Following addition of the epichlorohydrin (which required about ½ hour), the reaction mass was maintained at temperature (i. e., 130–132° C.) for an additional ¾ hour. It was then cooled to 50° C. and then put under 25 mm. Hg absolute pressure while heating to 80° C. for devolatilization. After devolatilization the reaction mass was again cooled to 50° C., then dumped into an open pot. The thereby obtained epichlorohydrin modified β-amino lower-alkyl carbamate reaction product was a water-soluble resin in the form of a thick, viscous liquid having a greenish-yellow color.

The resinous reaction product was then formulated with about 43.2 pounds of a 50 percent by weight aqueous solution of formaldehyde and about 24.3 pounds of water. To the thereby obtained dissolved, water white solution having a pH of about 6.9, there was added about 2.3 pounds of 2-amino isopropanol hydrochloride ("Catalyst AC").

The prepared formulation, diluted with water to about a 15 percent by weight solids content and containing about 0.25 percent by weight of a nonionic detergent was employed to treat an 80 x 80 square-woven, pure finish cotton fabric that weighed about 4 ounces to the square yard. The fabric was immersed in the formaldehyde adduct finish formulation and subsequently physically squeezed of enough excess liquid so that the pick up, based on the weight of the fabric, was about 10.9 percent by weight of active solids from the formulation. The treated cloth was then dried at 212° F. for five minutes and cured at 300° F. for about four and one-half minutes. It was then washed in a 0.25 percent by weight aqueous solution of mild soap and rinsed thoroughly with water at about 50° C. before being dried at 212° F. for five minutes. After being conditioned overnight at a constant room temperature and relative humidity, a portion of the treated fabric was subjected to a test using an apparatus known as the Monsanto Wrinkle Recovery Tester according to A. A. T. C. C. Tentative Test No. 66–53 which was presented at page 165 of the 1953 A. A. T. C. C. Yearbook. In the test, which consists essentially of pressing the creased fabric for a given period and measuring the retained angle of the crease, an angle of 0° indicates no wrinkle resistance while an angle of 180° indicates optimum wrinkle resistance. The wrinkle recovery angle of the treated fabric in the warp direction was determined by this test to be 148°. In comparison, the untreated fabric had a wrinkle recovery angle of only 82° and that of a similar fabric treated with "Rhonite R-1" was 143°. "Rhonite R-1," a widely used and accepted commercially available crease resistant finish material that is available from Rohm & Haas Co., is a 50 percent aqueous solution of dimethylol ethylene urea. Furthermore, there was no discoloration imparted to the fabric treated in accordance with the invention due to the curing of the applied finish at the elevated thermosetting temperature and the chlorine retention of the treated fabric, as determined in accordance with A. A. T. C. C. Tentative test 69–52, was found to be very low and well within the limits of commercial acceptability. The loss in tensile strength of the fabric, even after exposure to chlorine, was not excessive.

Similar excellent results may be obtained with other thermosetting resinous compositions and formulations for providing them in accordance with the invention when they are employed in the foregoing manner on cotton and other textile cloth and fabric in order to improve their crease and wrinkle resisting properties.

What is claimed is:

1. Thermosetting, resinous composition comprising an adduct of from 2.0 to 4.0 moles of formaldehyde with each mole of modified urea in a reaction product of 1.0 mole of urea and between about 0.6 and 1.2 moles of an alkylene oxide, said reaction product consisting preponderantly of β-amino lower-alkyl carbamates of the formula:

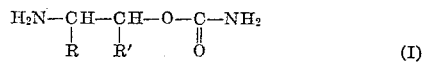

(I)

wherein R and R' are members of the class consisting of hydrogen and lower alkyl groups of from 1 to 4 carbon atoms, the sum of the carbon atoms present in R and R' combined being not greater than 4, said reaction product being also modified with between about 0.05 and 0.40 moles of epichlorohydrin for each mole of modified urea therein said composition being characterized in being water-soluble until cured to a thermoset solid at a temperature between about 250° F. and 400° F. for a period of time between about one and ten minutes.

2. A textile material provided with a crease-resistant finish that is comprised of a thermoset resinous composition in accordance with the composition set forth in claim 1.

3. The composition of claim 1, wherein the urea-alkylene oxide reaction product is the product of the reaction between about 0.85 moles of the alkylene oxide and each mole of urea that has been modified with in the neighborhood of 0.1 mole of epichlorohydrin for each mole of modified urea therein.

4. A composition in accordance with the composition set forth in claim 3, wherein the alkylene oxide is propylene oxide.

5. The textile material of claim 2 containing between about 5 and 30 percent by weight of the finish, based on the weight of the textile material.

6. A cellulosic textile material according to claim 2.

7. Applicating formulation that is adapted to provide crease-resistant thermoset resinous textile finishes upon being subjected to a resin curing temperature between about 250° and 400° F. for a period of time between about one and ten minutes, said formulation comprising, in an aqueous solution, a reaction product of 1.0 mole of urea and between about 0.6 and 1.2 moles of an alkylene oxide, said reaction product consisting preponderantly of β-amino lower-alkyl carbamates of the formula (I), said reaction product being modified with between about 0.05 and 0.40 moles of epichlorohydrin for each mole of modified urea therein; and between about 2.0 and 4.0 moles of formaldehyde for each mole of modified urea in said β-amino lower alkyl carbamate epichlorohydrin modified reaction product; and a minor proportion of a catalyst for curing the reaction product and the formaldehyde to a resinous adduct composition.

8. A formulation in accordance with the formulation set forth in claim 7, wherein the catalyst is an alkanolamine hydrochloride curing accelerator.

9. A formulation in accordance with the formulation set forth in claim 7, wherein the catalyst is a magnesium chloride curing accelerator.

10. A formulation in accordance with the formulation set forth in claim 7, wherein the catalyst is present in an amount up to about 10 percent by weight, based on the weight of the active solids in the formulation.

11. A formulation in accordance with the formulation set forth in claim 7, wherein the pH is between about 6.0 and 7.0.

12. The formulation of claim 7 containing as much as 70 percent by weight of dissolved, active solids, based on the weight of the formulation.

13. Method for improving the crease resistance of textile materials which comprises impregnating the textile material with between about 5 and 30 percent by weight of active solids from a resinous formaldehyde adduct composition-providing formulation containing, in aqueous solution, a reaction product of 1.0 mole of urea and between about 0.6 and 1.2 moles of an alkylene oxide, said reaction product consisting preponderantly of β-amino lower-alkyl carbamates having the formula (I), said reaction product being modified with between 0.05 and 0.40 moles of epichlorohydrin for each mole of modified urea therein, between about 2.0 and 4.0 moles of formaldehyde for each mole of modified urea in said β-amino lower-alkyl carbamate epichlorohydrin modified reaction product; and a catalyst for curing the reaction product and the formaldehyde to a resinous formaldehyde adduct composition; and subjecting said impregnated textile material to a resin curing temperature between about 250 and 400° F. for a period of time between about one and ten minutes.

14. In the method of claim 13, the epichlorohydrin modified urea-alkylene oxide reaction product that is contained in said applicating formulation being the product of the reaction between about 0.8 moles of the alkylene oxide for each mole of urea that is further modified with in the neighborhood of 0.1 moles of epichlorohydrin for each mole of modified urea.

15. A method in accordance with the method set forth in claim 13, wherein the alkylene oxide is propylene oxide.

16. The method of claim 13, wherein the formulation for impregnating the textile material contains between about 5 and 40 percent by weight of dissolved active solids.

17. The method of claim 13 and including the step of drying the impregnated textile material substantially free from water before exposing it to a curing temperature.

18. In the method of claim 13, subjecting said impregnated textile material to a resin curing temperature of about 300° F. for a period of time of about four to five minutes.

No references cited.